United States Patent
Iketani et al.

(10) Patent No.: US 6,541,529 B1
(45) Date of Patent: Apr. 1, 2003

(54) POLYMER COMPOSITION FOR POWDER FOAM MOLDING, POWDER THEREOF, FOAM OBTAINED THEREFROM, PROCESS FOR PRODUCING THE SAME, AND MOLDED ARTICLE COMPRISING THE FOAM

(75) Inventors: Kohichi Iketani, Ichihara (JP); Yoshihiro Nakatsuji, Chiba (JP); Kohsuke Ohtani, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/890,074

(22) PCT Filed: Jan. 20, 2000

(86) PCT No.: PCT/JP00/00239

§ 371 (c)(1), (2), (4) Date: Oct. 24, 2001

(87) PCT Pub. No.: WO00/44820

PCT Pub. Date: Aug. 3, 2000

(30) Foreign Application Priority Data

Jan. 27, 1999 (JP) .......................................... 11-018193

(51) Int. Cl.$^7$ .................................................. C08J 9/00
(52) U.S. Cl. ............................ 521/96; 521/85; 521/94; 521/135; 521/178; 521/149
(58) Field of Search ................................. 521/149, 135, 521/178, 85, 94, 96

(56) References Cited

U.S. PATENT DOCUMENTS

| 5,532,055 A | 7/1996 | Igarashi et al. |
| 5,576,080 A | 11/1996 | Sugimoto et al. |

FOREIGN PATENT DOCUMENTS

| EP | 0 711 658 A2 | 5/1996 |
| JP | 9-165463 | 6/1997 |
| JP | 10-259231 A | 9/1998 |
| JP | 10-259234 A | 9/1998 |

Primary Examiner—Morton Foelak
(74) Attorney, Agent, or Firm—Birch, Stewart, Kolasch & Birch, LLP

(57) ABSTRACT

A polymer composition for powder foam molding which comprises (A) a polymer having an epoxy group, (B) a peroxide having a temperature for obtaining a half-life of 10 hours of 100° C. or higher, (C) at least one of quaternary ammonium salts and quaternary phosphonium salts, and (D) a thermally decomposable foaming agent. According to the present invention, the polymer composition for powder foam molding, excellent in storage stability, capable of crosslinking and foaming in a short time, capable of giving a foam having a small compression set, excellent surface texture and little skin lack of hiding, powder of the composition, a foam obtained from the composition, a method for producing the foam, and a molded article comprising the foam.

19 Claims, No Drawings

POLYMER COMPOSITION FOR POWDER FOAM MOLDING, POWDER THEREOF, FOAM OBTAINED THEREFROM, PROCESS FOR PRODUCING THE SAME, AND MOLDED ARTICLE COMPRISING THE FOAM

This application is the national phase under 35 U.S.C. §371 of PCT International Application No. PCT/JP 00/00239 which has an International filing date of Jan. 20, 2000, which designated the United States of America and was not published in English.

TECHNICAL FIELD

The present invention relates to a polymer composition for powder foam molding, powder thereof, a foam obtained therefrom, a process for producing the foam, and a molded article comprising the foam. More specifically, the present invention relates to a polymer composition containing a polymer having an epoxy group as a polymer component, and being excellent in storage stability in an uncrosslinked state, capable of being crosslinked and foamed in a short period of time and capable of providing a foam having a small compression set, an excellent surface texture and little skin lack of hiding, powder thereof, a foam obtained from the composition, a process for producing the foam and a molded article comprising the foam.

PRIOR ART

Automobile interior parts such as instrument panels, head rests, arm rests, and door trims have remarkably shifted from conventional hard types to soft types. These parts are composed of an embossed surface layer and a foam layer as a cushioning layer. As a material of the foam layer, a crosslinkable foamable polymer composition is used, but it has a drawback in that the crosslinking thereof is promoted while being stored and properties of the composition change, therefore, there is a problem in that it is difficult to obtain stably compositions with desired properties.

Besides, in the production of automobile interior parts, after an article composed of a surface layer and a foam layer, integrally molded is formed by powder slush molding, a post-processing is required for applying a resin to a surface on the foam layer side by injection molding so as to form a reinforcing layer. Here since a high temperature and a high pressure (a temperature of approximately 100° C. to 280° C., and a pressure of approximately 15 Kgf/cm$^2$ to 600 Kgf/cm$^2$) are applied to the foam layer side, a problem arises in that the foam layer is destroyed and the function as a cushioning member is significantly deteriorated.

At the present time, there has not been found a method which can stably obtain a foam having a smooth and excellent surface texture, and further a small compression set enough to resist under a high temperature and a high pressure during infection molding.

DISCLOSURE OF THE INVENTION

Under these circumstances, an object of the present invention is to provide a polymer composition containing a polymer having an epoxy group as a polymer component, excellent in storage stability in an uncrosslinked state, capable of being crosslinked and foamed in a short period of time, and also capable of providing a foam having a small compression set, an excellent surface texture and little surface lack of hiding, further, powder of the composition, a foam obtained from the composition, a method for producing a foam, and a molded article comprising the foam.

Namely, the present invention relates to a polymer composition for powder foam molding which comprises (A) a polymer having an epoxy group, (B) a peroxide having a temperature for obtaining a half-life of 10 hours of 100° C. or higher, (C) at least one of quaternary ammonium salts and quaternary phosphonium salts, and (D) a thermally decomposable foaming agent.

Further, the present invention relates to a powder comprising the polymer composition, a foam obtained by crosslinking and foaming the powder, and a method for producing the foam.

Furthermore, the present invention relates to a two-layer molded article obtained by laminating a non-foam layer of a thermoplastic elastomer composition or a vinyl-chloride-based resin composition on a foam layer made of the foregoing foam, and relates to a multi-layer molded article obtained by laminating a protective layer of a thermoplastic resin composition or a thermoplastic elastomer composition on the foam layer side of the foregoing two-layer molded article.

BEST MODE FOR CARRYING OUT THE INVENTION

In the present invention, the polymer (A) having an epoxy group is not particularly limited so far as it is a polymer containing an epoxy group used as a crosslinking point, and any one used for producing a crosslinked foam can be used.

A preferable epoxy group having polymer (A) is described below. A copolymer of a monomer containing an epoxy group used as a crosslinking point with a monomer copolymerizable therewith is preferably.

As the epoxy group-containing monomer, unsaturated glycidyl carboxylates such as glycidyl acrylate, glycidyl methacrylate, glycidyl itaconate and the like; and unsaturated glycidyl ethers such as vinyl glycidyl ether, allyl glycidyl ether, methacryl glycidyl ether and the like. Among these, glycidyl methacrylate and glycidyl acrylate are preferable.

As the monomer copolymerizable with the epoxy group-containing monomer, there are listed vinyl monomers having no epoxy group such as vinyl carboxylates (e.g. vinyl acetate, vinyl propionate), vinyl ketones (e.g. methyl vinyl ketone, ethyl vinyl ketone), and vinyl aromatic compounds (e.g. styrene, α-methyl styrene, vinyl toluene), and esters of unsaturated carboxylic acid (e.g. methyl acrylate, ethyl acrylate, propyl acrylate, n-butyl acrylate, n-octyl acrylate, methoxy methyl acrylate, methoxy ethyl acrylate, methyl methacrylate, ethyl methacrylate, propyl methacrylate); α-olefins such as ethylene, propylene, 1-butene and the like; and dienes such as butadiene and the like. These monomers may be used alone or in combination of two or more so as to be copolymerized with the epoxy group-containing monomer.

Examples of the epoxy group-containing polymer (A) includes: ethylene-vinyl acetate-epoxy group-containing monomer copolymers (for example, ethylene-vinyl acetate-glycidyl acrylate copolymer and ethylene-vinyl acetate-glycidyl methacrylate copolymer); ethylene-(meth)acrylate-epoxy group-containing monomer copolymers (for example, ethylene-methyl acrylate-glycidyl acrylate copolymer, ethylene-methyl methacrylate-glycidyl acrylate copolymer, ethylene-methyl acrylate-glycidyl methacrylate copolymer, and ethylene-methyl methacrylate-glycidyl methacrylate copolymer); ethylene-vinyl acetate-(meth)acrylate-epoxy group-containing monomer copolymers (for example, ethylene-vinyl acetate-methyl acrylate-glycidyl acrylate copolymer, and ethylene-vinyl acetate-methyl methacrylate-glycidyl acrylate copolymer); ethylene-propylene-epoxy group-containing monomer copolymers (for example, ethylene-propylene-glycidyl methacrylate copolymer, and ethylene-propylene-glycidyl actylate copolymer); (meth) acrylate-acrylonitrile-epoxy group-containing monomer copolymers (for example, acrylonitrile-methyl acrylate-glycidyl methacrylate copolymer, and acrylonitrile-methyl methacrylate-glycidyl methacrylate copolymer), ethylene-butadiene-epoxy-group containing monomer copoblymers (for example, ethylene-butadiene-glycidyl methacrylate copolymer, and ethylene-butadiene-glycidyl acrylate copolymer); and styrene-butadiene-epoxy group-containing monomer copolymers (for example, styrene-butadiene-glycidyl methacrylate copolymer, and styrene-butadiene-glycidyl acrylate); and the like.

The epoxy group-containing copolymer (A) preferably contains 0.1 to 35 wt % of epoxy group-containing monomer units functioning as crosslinking points, in the total of monomer units. More preferably, the copolymer (A) is obtained by copolymerizing 0.1 to 35 wt % (further preferably, 1 to 30 wt %) of the epoxy group-containing monomer, 30 to 99.8 wt % (further preferably, 40 to 98 wt %) of ethylene, α-olefin or diene, and 0.1 to 35 wt % (further more preferably, 1 to 25 wt %) of a vinyl monomer containing no epoxy group, or alternatively, 0.1 to 35 wt % (further preferably, 1 to 30 wt %) of the epoxy group-containing monomer, and 65 to 99.9 wt % (further preferably, 70 to 99 wt %) of the vinyl monomer containing no epoxy group, by a known polymerizing method such as solution polymerization, emulsion polymerization, suspension polymerization, slurry polymerization, or gas phase polymerization.

The peroxide (B) used in the present invention is a peroxide which has a temperature for obtaining a half-life of 10 hours of not lower than 100° C. When the temperature for obtaining the half-life of 10 hours is lower than 100° C., there are caused problems that the storage stability in the uncrosslinked state does not improved, a skin lack of hiding in the foam obtained appears, and the expandable ratio do not increase.

Examples of the peroxide (B) include: 2,5-dimethyl-2,5-di(benzoylperoxy)hexane, 2,5-bis(tert-butylperoxy)octane, tert-butylperoxy acetate, 2,2-bis(tert-butylperoxy)butane, tert-butylperoxy benzoate, n-butyl-4,4-bis(tert-butylperoxy) valerate, di-tert-butyldiperoxy isophthalate, methyl ethyl ketone peroxide, dicumylperoxide, 2,5-dimethyl-2,5-di(tert-butylperoxy)hexane, α,α'-bis(tert-butylperoxy-m-isopropyl)benzene, tert-butyl cumyl peroxide, diisopropyl-benzene hydroperoxide, di-tert-butyl peroxide, p-menthane hydroperoxide, 2,2-dimethyl-2,5-di(tert-butylperoxy) hexine-3,1,1,3,3-tetramethylbutylhydroperoxide, 2,5-dimetylhexane-2,5-dihydroperoxide, cumene hydroperoxide, tert-buiyl hydroperoxide, and the like. These compounds may be used alone or in combination of two or more. Among them, α,α'-bis(tert-butylperoxy-m-isopropyl) benzene, and 2,5-dimethyl-2,5-di(tert-butylperoxy)hexane are preferable.

The amount of the peroxide (B) compounded is preferably 0.1 to 10 parts by weight, and more preferably 0.3 to 7 parts by weight per 100 parts by weight of the epoxy group-containing polymer (A). When the amount of the peroxide (B) compounded is excessively little, the compression set becomes large because of lowering of a crosslinking density. On the other hand, when the amount of the peroxide (B) is excessively much, there may cause problems that, because of high crosslinking density, though the compression set becomes small, the expandable ratio does not increase, the storage stability of the uncrosslinked composition deteriorates and the cost increases.

The component (C) of the present invention is at least one selected from the group consisting of quaternary ammonium salts and quaternary phosphonium salts.

Examples of quaternary ammonium salts include octadecyl-trimethyl ammonium bromide, hexadecyl-trimethyl ammonium bromide, dodecyl-trimethyl ammonium bromide, hexadecyl-dimethylbenzyl ammonium bromide, methyl-hexadecyl-dibenzyl ammonium bromide, hexadecyl-pyridinium bromide, tetraethyl ammonium bromide, tetrabutyl ammonium bromide, octadecyl-trimethyl ammonium chloride, hexadecyl-trimethyl ammonium chloride, dodecyl-trimethyl ammonium chloride, hexadecyldimethylbenzyl ammonium chloride, methyl-hexadecyldibenzyl ammonium chloride, hekadecyl-pyridinium chloride, tetraethyl ammonium chloride, and tetrabutyl ammonium chloride.

Examples of quaternary phosphonium include triphenyl-benzyl phosphonium chloride, triphenylbenzyl phosphonium bromide, Triphenylbenzyl phosphonium iodide, Triphenytrimethoxymethyl phosphonium chloride, Triethylbenzyl phosphoniumhloride, tricyclohexylbenzyl phosphonium chloride, trioctylmethyl phosphonium dimethylphosphate, tetrabutyl phosphonium bromide, trioctylmethyl phosphonium acetate, and the like.

The amount of the component (C) compounded is preferably 0.1 to 10 parts by weight, and more preferably 0.1 to 7 parts by weight per 100 parts by weight of the component (A). As the component (C), these compounds may be used alone or in combination of two or more thereof. When two or more kinds are used in combination, the amount of the component (C) means total amounts thereof. When the amount of the component (C) is excessively little, it may cause to deteriorate the compression permanent set of the foam, though the storage stability of the uncrosslinked composition is superior. On the other hand, when the amount of the component (C) is excessively much, this might cause such problems that cracks of foam generate, the storage stability of the uncrosslinked composition deteriorates and the cost increases.

As the thermally decomposable foaming agent (D) used in the present invention, one having a decomposition temperature of 120 to 230° C. is preferable. Examples of such afoaming agent include azodicarbonamide, 2,2'-azobisisobutyronitrile, diazodiaminobenzene, benzene sulfonylhydrazide, benzene-1,3-sulfonylhydrazide, diphenylsulfone-3,3'-disulfonylhydrazide, diphenyl-oxide-4,4'-disulfonylhydrazide, 4,4'-oxybis (benzenesulfonylhydrazide), p-toluenesulfonylhydrazide, N,N'-nitrosopentamethylenetetramine, sodium bicarbonate, and the like. Among them, azodicarbonamide is preferably used.

The amount of the thermally decomposable foaming agent (D) compounded is preferably 0.1 to 20 parts by weight, and more preferably 0.3 to 13 parts by weight per 100 parts by weight of the polymer (A) having an epoxy group. The thermally decomposable foaming agent (D) may be used alone orin combination of plural kinds thereof. When two or more kinds are used in combination, the amount of the component (C) means total amounts thereof. When the content of the thermally decomposable foaming agent (D) is excessively little, there is a problem in a softness as a cushioning materials because the expandable ratio is low. On the other hand, when the content of the thermally decomposable foaming agent (D) is excessively much, this might cause such problems as the inferior surface skin of the foam, and damages of the foam by cracking.

The aforementioned composition of the present invention is preferably used for powder foam molding.

In the polymer composition for powder foam molding, a cross linking aid (E) and a foaming aid (F) can be optionally added in addition to the (A) to (D) as essential components. Specific examples of the crosslinking aid (E) include triallylisocyanurate, ethylene glycol dimethacrylate, diethylene glycol dimethacrylate, N,N'-m-phenylenebismaleimide, polyethylene glycol dimethacrylate, trimethylol propane trimethacrylate, allyl methacrylate, nitrobenzene, p-quinone dioxime, p,p'-dibenzoyl quinone dioxime, and the like, and these may be used alone or in combination of two or more. Among them, triallylisocyanurate and ethylene glycol dimethacrylate are preferable. The used amount is preferably 0.1 to 10 parts by weight per 100 parts by weight of the polymer (A) having an epoxy group. Specific example of the foaming aid include zinc stearate, calcium stearate, stearic acid, urea auxiliaries, triethanolamine, zinc white, zinc carbonate, titanium white, carbon black, and the like. Zinc white is particularly preferable. The amount added, in the case of zinc white, is preferably 0.1 to 50 parts by weight, and more preferably 0.5 to 35 parts by weight per 100 parts by weight of the polymer (A) having an epoxy group, and the amount added, in the case of the other foaming aids, is preferably 0.1 to 10 parts by weight. When zinc white is added, particularly, a foam in which the surface lack of hiding hardly generates when it is molded at a high temperature, and the surface texture is improved, is obtained.

Furthermore, a reinforcing agent, a filler, a plasticizer, an antioxidant, a stabilizer, an ultraviolet absorber, a processing aid, a mold releasing agent, and the like that are normally used in the resin industry, the rubber industry, etc. are mixed by means of an ordinary kneading machine such as a Banbury mixer, or a kneader, and thereafter it is pelletized by an extruder.

Powder used for powder foam molding preferably has a sphere-reduced average particle diameter of 50 to 1200 $\mu$m, and more preferably 100 to 900 $\mu$m. When the particle diameter is excessively small, the powder splitting property deteriorates, which might result in inferior surface skin of an obtained foam. On the other hand, when the average particle diameter is excessively large, the obtained surface texture may be inferior since the thermal fusion between pellets on powder slush molding is insufficient, which might result in inferior surface skin of a foam obtained. Incidentally, the sphere-reduced average particle diameter is a particle diameter obtained by determining an average volume of the powder particles and then calculating a diameter of a sphere having the same volume.

Herein, the average volume is a value calculated by dividing an average weight of the particles by a density of the powder composition for crosslinking and foaming, the average weight being calculated by dividing a total weight of randomly sampled 100 particles of the crosslinkable foamable powder by the number of particles.

When the powder of the present invention is heated to a temperature that is not lower than the fusing temperature of the powder and not lower than the decomposition temperature of the thermally decomposable foaming agent, the powder is crosslinked and foamed, whereby a foam is obtained. Specific methods include powder molding methods such as powder slush molding, rotational molding, spraying, electrodeposition, etc., and from the viewpoint of cost and productivity, it is particularly preferable to crosslink and foam the powder by powder slush foam molding.

The foam produced from the powder has a small compression set, an excellent surface skin, and hardly has skin lack of hiding. By laminating a non-foam layer made of a thermoplastic elastomer composition or a vinyl chloride-based resin composition on the foam layer composed of the foam, a two-layer molded article can be obtained.

Furthermore, by laminating a protective layer made of a thermoplastic resin composition or a thermoplastic elastomer composition on the foam layer side of the two-layer molded article, a multi-layer molded article can be obtained.

Moreover, by laminating a core made of a thermoplastic resin composition on the foam layer side of the two-layer molded article, a multi-layer product different from the above can be obtained.

Furthermore, the foregoing multi-layer molded article may be provided with a core layer of a thermoplastic resin composition on the protective layer side of the foregoing multi-layer molded article.

Furthermore, a molded foam layer of a bead-foaming or a forming similar thereto may be formed on the foam layer side of the two-layer molded article, and thereafter, a core layer of a thermoplastic resin composition may be bonded thereon, so that a multi-layer molded article can be obtained.

Furthermore, by unifying a two-layer molded article and a core layer made of a thermoplastic resin composition with each other via a bead-foaming layer, a multi-layer molded article can be obtained.

A foam according to powder slush molding, is obtained by, for example, in such a manner as a mold whose molding surface may have designs is preheated, the crosslinkable foamable powder of the present invention is supplied on the mold, whereby the powder particles are thermally fused with each other so that a sheet-like melt is obtained on the molding surface and the excessive portion of the powder which is not fused is removed, and thereafter, the mold is placed in an oven (at a temperature of normally 160° C. to 260° C. for 15 seconds to 5 minutes) for crosslinking and foaming. Then, the mold is taken out of the oven and is cooled, and a foam thus cooled is released from the mold.

A two-layer molded article composed of a non-foam surface layer and a foam layer, obtained by powder slush molding, is formed in the following manner, for example, a mold whose molding surface may have complicated designs is preheated (to a temperature normally in a range of 170° C. to 320° C., and not lower than a melting point of a resin powder for surface skin), the resin powder for surface skin is supplied over the molding surface of the mold, so that the powder particles are thermally fused with each other, to obtain a sheet-like melt on the molding surface, and then, the excessive powder which is not fused is removed. Subsequently, a crosslinkable foamable powder is supplied over the sheet-like melt so that the particles of the powder are thermally fused with each other, to obtain a sheet-like melt over the molding surface, and then, the excessive powder which is not fused is removed. Thereafter, it is crosslinked and foamed in an oven (at a temperature of normally 160° C. to 450° C. for 15 seconds to 5 minutes), and is taken out of the oven so that the mold is cooled, and finally, a two-layer product thus cooled is released from the mold.

The production of a multi-layer molded article by powder slush molding is carried out in a similar manner to the foregoing manner of two-layer molded article production. More specifically, for example, a multi-layer molded article composed of a non-foam surface skin layer, a foam layer, and a protective layer is produced in the following manner, for example, a crosslinkable foamable powder-fused layer is formed on the surface skin layer, and thermoplastic resin powder or thermoplastic resin composition powder is supplied thereon so that the particles of the powder are thermally fused with each other, to obtain a sheet-like melt over the molding surface, and then, the excessive powder which is not fused is removed. Thereafter, it is cross-linked and foamed in an oven (at a temperature of normally 160° C. to 260° C. for 15 seconds to 5 minutes), and is taken out of the oven so that the mold is cooled, and finally, a multi-layer product is released from the mold.

Since the crosslinkable foamable powder composition of the present invention is excellent in storage stability in an uncrosslinked state, the crosslinking does not proceed during storage. Furthermore, when the composition is used for forming a two-layer molded article composed of a non-foam surface skin layer and a foam layer by powder slush molding, the obtained article has a small compression set and an excellent surface texture, and hardly has surface lack of hiding. Therefore, even after a core layer is laminated on the article, the article has a smooth and excellent appearance from the surface layer side, and is able to keep excellent feeling. Furthermore, since a foam with sufficient performance can be obtained even under crosslinking and foaming conditions of a low temperature and a short time, cost reduction and improved productivity can be achieved. Therefore, the foam is applied for a wide range of uses, for example, as various cushioning materials for automobiles, building constructions, and general industries, more specifically, for instrument panels, headrests, consoles, armrests, door trims, etc of automobiles.

EXAMPLES

The present invention is illustrated specifically by Examples, but the present invention is not limited by the Examples.

In the Examples and Comparative Examples, polymers, peroxides, foaming agents, and foaming aids shown below, and additives shown in Tables were used.

[Epoxy Group-containing Copolymer] (Ratio is Shown by Weight)

COPOLYMER-1: Ethylene/vinyl acetate/glycidyl methacrylate=80/2/18, MFR=340 g/10 min.

COPOLYMER-2: Ethylene/vinyl acetate/glycidyl methacrylate=88/5/7, MFR=20g/10 min.

[Peroxide]

Pierbutyl P40: α,α'-bis(tert-butylperoxy-m-isopropyl) benzene: temperature for obtaining a half-life of 10 hours; 119° C.

Perhexa 25B40: 2,5-dimethyl-2,5-di(tert-butylperoxy) hexane: temperature for obtaining a half-life of 10 hours; 118° C.

Perhexa 3M40: 1,1-bis(tert-butylperoxy)-3,3,5-trimethylcyclohexane: temperature for obtaining a half-life of 10 hours; 90° C.

Incidentally, each peroxide used in the Examples and Comparative Examples was a product diluted to 40 wt %. For example, in the case of addition of 6 parts by weight in the Tables, this means addition of 2.4 parts by weight (6 parts by weight x 0.4) in terms of pure peroxide.

[Symboles of Additives]

ODTMA-Br: octadecyltrimethylammoniumbromide
ODTMA-Cl: octadecyltrimethylammoniumchloride
MTPP-Br: methyltriphenylphosphoniumbromide
TAIC-M60: triallylisocyanurate produced by Nippon Kasei Co., Ltd.
Naugard 445: antioxidant manufactured by Uniroyal Co.
Sumilizer TPS: antioxidant manufactured by Sumitomo Chemical Co., Ltd.
Celmike S: oxybenzenesulfonylhydrazide as foaming agent produced by Sankyo Kasei Co., Ltd.
Celmike C121: azodicarbonamide as foaming agent produced by Sankyo Kasei Co., Ltd.

The Examples and Comparative Examples were carried out in the following manner.

[Kneading]

Components shown in Tables 1 to 3 were put into a Laboplastomill (capacity: 100 ml) made by Toyo Seiki Seisakusho, Ltd., and were kneaded at a temperature of 105° C., at a revolution number of 50 rpm, for a kneading time of 5 minutes, at a charge rate of 80%.

[Freeze Pulverization]

The kneaded compound thus obtained was pressed into a sheet-like form before being cooled, and was cut into approximately 5 mm×5 mm squares by scissors. The cut sample thus obtained was immersed in liquid nitrogen for approximately 5 minutes, and subsequently supplied to Labo-freeze pulverizer manufactured by Toyo Seiki Seisakusho, Ltd. As a result, crosslinkable foamable powder with a sphere-reduced average particle diameter of 350 μm was obtained.

[Foaming by Powder Slush Molding]

A 150 mm-square embossed mold was preheated to 260° C., and then, resin powder for surface skin layer forming was heaped on the mold and left for 15 seconds. The excessive powder which was not fused was removed, and maintained in the state for 30 seconds. Subsequently, the crosslinkable foamable powder obtained as described above was supplied on the obtained sheet-like melt and left for 20 seconds. The excessive crosslinkable foamable powder which was not fused was removed, and the mold was placed in a gear oven at 220° C. for 2 minutes for crosslinking and foaming. The mold was then taken out of the gear oven and water-cooled. Consequently, a two-layer molded article composed of a non-foam surface skin layer and a foam layer was obtained.

Evaluations of the foamed article were conducted as follows.

[Measurement of Expansion Ratio]

The surface layer of the foregoing two-layer molded article was stripped with a cutter so that only the foamed layer was sampled, and densities of the same before and after the foaming were measured. The expansion ratio was calculated by the following formula. The respective densities were measured by an Automatic Densimeter manufactured by Toyo Seiki Seisaku-sho, Ltd.

FOAMING RATIO=DENSITY BEFORE FOAMING/DENSITY OF FOAM

[Evaluation of Surface Texture of Foam]

Superiority or inferiority was visually judged for the condition of the surface texture of foamed article side of the two-layer molded article obtained by the fore-mentioned powder slush molding. When the unevenness of surface texture is remarkable, it was judged as unusable because the unevenness is transcribed on the skin side at lamination of the reinforced layer.

Surface texture is excellent and it is practically usable. ---------------- ○

Slight unevenness is observed on surface but it is practically usable. ------ ○△

Unevenness is observed on surface and it is practically unusable. ---- Δ

Unevenness is remarkably observed on surface and it is unusable. ------------- X

[Skin Lack of Hiding]

Skin lack of hiding was judged as a measure of the adherence of interface between the foamed article and the black skin layer of the two-layer molded article obtained by the fore-mentioned powder slush molding. When large cells are generated on the interface, the part of the skin layer becomes extremely thin and the adherence of the interface becomes poor. Further, when the skin layer becomes partially thin, it is becomes poor in viewpoint of design and unusable for practical uses. Accordingly, the interface is preferably a foamed layer of micro cells. When the foamed layer side is faced to a fluorescent lamp and observed from the black skin layer side, the points where the skin is thin is seemed to be bright when there is a skin lack of hiding, and therefore, the adherence of interface can be judged. It was judged by the four stages described below.

There is no skin lack of hiding and it is practically usable. ----------------- ○

Slight skin lack of hiding is observed but it is practically usable. ----- ○Δ

There is a skin lack of hiding and it is practically unusable. --------------- Δ

There is a remarkable skin lack of hiding and it is practically unusable.-- X

[Measurement of Compression Set]

The foamed article was compressed by a hand press under the following conditions and compression set was determined as follows.

Pressing temperature: upper hot plate; 200° C., lower hot plate; 25° C.

Pressing time: 5 seconds

Thickness of the foamed article measured after having been left for 15 minutes after depressurized: $L_1$ Thickness of the foamed article before compressed: $L_0$ (Method of Calculation)

Compression set(%)=100−($L_1/L_0$)100

[Evaluation of Storage Stability]

The crosslinkable foamable powder was placed in thermostats set to 23° C., 40° C., and 55° C., respectively, so that how the molding property varies with time was examined in each case. A Molded article obtained by slush molding of the crosslinkable foamable powder on the next day of production of the powder was used as control, and molded bodies formed with thermally treated crosslinkable foamable powder were compared with the foregoing control, with regard to superiority/inferiority of surface skin of a foam layer of each molded product to that of the control. Powder in inferior storage stability that was early crosslinked while being stored exhibited small fluidity, and therefore, a molded article formed with the powder had a foam layer with inferior surface feeling.

It was judged by the four stages described below.

Excellent, usable -------------------- ○

Fair, practically usable ------------- ○Δ

Inferior surface feeling, practically unusable -------------------- Δ

Remarkably inferior surface feeling, practically unusable ------------------ X

[Cell Size]

By applying a scale loupe to a cross section of each foamed article, cell sizes were measured.

less than 0.5 mm --- micro 0.5 mm–less than 1.5 mm --- small 1.5 mm–less than 2 mm --- medium not less than 2.5 mm --- large

[Consideration of Results]

All the examples satisfying the conditions of the present invention reached sufficient levels as to all items of the evaluation. On the other hand, the comparative example 1 that was out of the range of the present invention utilized a peroxide whose temperature for obtaining a half-life of 10 hours was 100° C. or below, and hence, it was inferior in skin surface and skin lack of hiding of the foam, and in storage stability and the like. Because Comparative Examples 2 to 6 use ammonium compounds other than quaternary ammonium salts, the compression set is large, and the skin lack of hiding appears.

TABLE 1

|  | Example | | Comparative |
| --- | --- | --- | --- |
|  | 1 | 2 | Example |
| Copolymer-1 | 75 | 75 | 75 |
| Copolymer-2 | 25 | 25 | 25 |
| Perbutyl P40 | 6 |  |  |
| Perhexa 25B40 |  | 6 |  |
| Perhexa 3M40 |  |  | 4 |
| TAIC-M60 | 2 | 2 | 2 |
| ODTMA-Br | 3 | 3 |  |
| Celmike ®C121 | 3 | 3 | 3 |
| Celmike ®S | 0.25 | 0.25 | 0.25 |
| ZnO | 5 | 5 | 5 |
| Sumilizer ®TPS | 0.8 | 0.8 | 0.8 |
| Naugard ®455 | 0.4 | 0.4 | 0.4 |
| Expansion Ratio | 4.8 | 5.2 | 3.2 |
| Compression set (%) | 2 | 5 | 16 |
| Skin lack of hiding | ○ | ○ | X |
| Surface texture of foam | ○ | ○ | X |
| Cell size | Micro | Micro | Small |
| Storage stability of powder |  |  |  |
| 55° C. × 7 days | ○ | ○ | X |
| 70° C. × 2 days | ○ | ○ | X |

TABLE 2

|  | Example | | | |
| --- | --- | --- | --- | --- |
|  | 3 | 4 | 5 | 6 |
| Copolymer-1 | 75 | 75 | 75 | 75 |
| Copolymer-2 | 25 | 25 | 25 | 25 |
| Perbutyl P40 | 6 | 6 | 6 | 6 |
| TAIC-M60 | 2 | 2 | 2 | 2 |
| Cellmike ®C121 | 3 | 3 | 3 | 1.5 |
| Cellmike ®S | 0.5 | 0.5 | 0.5 | 0.25 |
| ZnO | 5 | 5 | 5 | 5 |
| ODTMA-Br | 1.5 |  |  | 1.5 |
| ODTMA-Cl |  | 1.5 |  |  |
| MTPP-Br |  |  | 1.5 |  |
| Sumilizer ®TPS | 1 | 1 | 1 | 0.8 |
| Naugard ®455 | 0.4 | 0.4 | 0.4 | 0.4 |
| Expansion ratio | 4.8 | 5 | 3.6 | 4.6 |
| Compression set (%) | 0 | 14 | 0 | 2 |
| Evaluation of slush molding |  |  |  |  |
| Skin lack of hiding | ○ | ○Δ | ○Δ | ○ |
| Surface texture of foamed product | ○ | ○Δ | ○ | ○ |
| Cell size | Micro | Micro | Micro | Micro |

TABLE 3

| | Comparative Example | | | | |
|---|---|---|---|---|---|
| | 2 | 3 | 4 | 5 | 6 |
| Copolymer-1 | 75 | 75 | 75 | 75 | 75 |
| Copolymer-2 | 25 | 25 | 25 | 25 | 25 |
| Perbutyl P40 | 6 | 6 | 6 | 6 | 6 |
| TAIC-M60 | 2 | 2 | 2 | 2 | 2 |
| Cellmike ®C121 | 3 | 3 | 3 | 1.5 | 1.5 |
| Cellmike ®S | 0.5 | 0.5 | 0.5 | 0.25 | 0.25 |
| ZnO | 5 | 5 | 5 | 5 | 5 |
| Ammonium carbonate | 1.5 | | | | |
| Ammonium succinate | | 1.5 | | | |
| Ammonium dihydrogenphosphate | | | 1.5 | | |
| Diammonium hydrogenphosphate | | | | 1.5 | |
| Ammonium phthalate | | | | | 1.5 |
| Sumilizer ®TPS | 1 | 1 | 1 | 0.8 | 0.8 |
| Naugard ®455 | 0.4 | 0.4 | 0.4 | 0.4 | 0.4 |
| Expansion ratio | 4.9 | 6 | 3.4 | 5.1 | 5.3 |
| Compression set (%) | 0 | 34 | 42 | 52 | 64 |
| Evaluation of slush moldability | | | | | |
| Skin lack of hiding | X | Δ | X | Δ | X |
| Surface texture of foam | Δ | X | ○ | Δ | Δ |
| Cell size | Small | Medium | Small | Large | Large |

Industrial Applicability

As described above, according to the present invention, it is possible to provide a polymer composition for powder foam molding, comprising a polymer having an epoxy group as one component, excellent in storage stability in an uncrosslinked state, capable of crosslinking and foaming in a short time, and capable of giving a foam having a small compression set, excellent surface texture and little skin lack of hiding, powder, a foam, a method for producing the foam and a molded article, using the composition.

What is claimed is:

1. A polymer composition for powder foam molding, consisting essentially of:

(A) a polymer having an epoxy group;

(B) a peroxide having a temperature for obtaining a half-life of 10 hours of 100° C. or higher;

(C) at least one compound selected from the group consisting of quaternary ammonium salts and quaternary phosphonium salts; and (D) a thermally decomposable foaming agent.

2. The copolymer composition according to claim 1, wherein a content of the peroxide (B) is 0.1 to 10 parts by weight per 100 parts by weight of the polymer (A).

3. The copolymer composition according to claim 1, wherein a content of the compound (C) is 0.1 to 10 parts by weight per 100 parts by weight of the polymer (A).

4. The polymer composition for powder foam molding according to claim 1, wherein a content of the foaming agent (D) is 0.1 to 20 parts by weight per 100 parts by weight of the polymer (A).

5. The polymer composition for powder foam molding according to claim 1, wherein contents of the peroxide (B), the compound (C), and the foaming agent (D) are 0.1 to 10 parts by weight, 0.1 to 10 parts by weight, and 0.1 to 20 parts by weight, respectively, per 100 parts by weight of the polymer (A).

6. The polymer composition for powder foam molding according to claim 1, further comprising zinc white in amount of 0.1 to 50 parts by weight per 100 parts by weight of the polymer(A).

7. The polymer composition for powder foam molding according to claim 1, further comprising zinc white in amount of 0.1 to 50 parts by weight per 100 parts by weight of the polymer(A).

8. The polymer composition for powder foam molding according to claim 1 or 6, wherein the polymer composition is used for powder slush foam molding.

9. A powder of the polymer composition for powder foam molding according to claim 1 or 6.

10. The powder according to claim 9, having a sphere-reduced average particle diameter of 50 to 1200 μm.

11. A foam obtained by crosslinking and foaming the powder of claim 9.

12. A foam obtained by crosslinking and foaming the powder of claim 9 by slush molding.

13. A method for producing a foam, which comprises crosslinking and foaming the powder of claim 9.

14. A method for producing a foam, which comprises crosslinking and foaming the powder of claim 9 by slush molding.

15. A two-layer molded article obtained by laminating a non-foam layer made of a thermoplastic elastomer composition or a vinyl chloride-based resin composition on a foam layer composed of the foam of claim 11.

16. A multi-layer molded article obtained by laminating a protective layer of a thermoplastic resin composition or a thermoplastic elastomer composition on the foam layer side of the two-layer molded article of claim 15.

17. A multi-layer molded article obtained by laminating a core of a thermoplastic resin composition on the foam layer side of the two-layer molded article of claim 15.

18. A multi-layer molded article obtained by laminating a core layer of a thermoplastic resin composition on the protective layer side of the multi-layer molded article of claim 16.

19. A multi-layer molded article obtained by forming a molded foam layer prepared by bead-foaming on the foam layer side of the two-layer of claim 15, and then adhering a core layer of a thermoplastic resin composition to the molded foam layer.

* * * * *